(12) United States Patent
Goldberg et al.

(10) Patent No.: US 9,920,511 B2
(45) Date of Patent: Mar. 20, 2018

(54) METHODS, SYSTEMS, AND SOFTWARE FOR PROVIDING A BLOCKED SEWER ALERT

(71) Applicant: Waste Innovation Concepts, LLC, Woodstock, VT (US)

(72) Inventors: Eric Goldberg, Woodstock, VT (US); Cliff Harper, Woodstock, VT (US)

( * ) Notice: Subject to any disclaimer, the term of this patent is extended or adjusted under 35 U.S.C. 154(b) by 0 days.

(21) Appl. No.: 15/493,097

(22) Filed: Apr. 20, 2017

(65) Prior Publication Data
US 2017/0306608 A1 Oct. 26, 2017

Related U.S. Application Data

(60) Provisional application No. 62/324,984, filed on Apr. 20, 2016, provisional application No. 62/372,989, filed on Aug. 10, 2016.

(51) Int. Cl.
| | | |
|---|---|---|
| *F17D 3/00* | (2006.01) | |
| *E03F 7/00* | (2006.01) | |
| *E03F 9/00* | (2006.01) | |
| *G01F 23/18* | (2006.01) | |
| *G08B 21/18* | (2006.01) | |

(52) U.S. Cl.
CPC ............ *E03F 7/00* (2013.01); *E03F 9/00* (2013.01); *G01F 23/18* (2013.01); *G08B 21/182* (2013.01); *E03F 2201/40* (2013.01)

(58) Field of Classification Search
CPC ....... F16K 37/0058; E03F 9/00; G08B 21/182
See application file for complete search history.

(56) References Cited

U.S. PATENT DOCUMENTS

| | | | | |
|---|---|---|---|---|
| 4,429,568 A | * | 2/1984 | Sullivan | G01M 3/022 138/90 |
| 4,546,346 A | | 10/1985 | Wave et al. | |
| 5,006,833 A | * | 4/1991 | Marlowe | E03F 7/00 340/605 |
| 6,443,955 B1 | | 9/2002 | Oakner et al. | |
| 7,191,649 B1 | | 5/2007 | Coogle | |
| 7,221,282 B1 | | 5/2007 | Ross et al. | |

(Continued)

FOREIGN PATENT DOCUMENTS

| | | |
|---|---|---|
| GB | 2497140 A | 5/2013 |
| WO | 20114653 A1 | 3/2001 |

OTHER PUBLICATIONS

Sump Pump Switches: Types and Repair, available at https://theplumbinginfo.com/sump-pump-switches/; accessed Jul. 13, 2017.

*Primary Examiner* — Craig Schneider
*Assistant Examiner* — Angelisa L Hicks
(74) *Attorney, Agent, or Firm* — Keegan M. Caldwell; Micah T. Drayton

(57) ABSTRACT

A blocked sewer unit includes a substantially impermeable barrier having a first side exposed to the interior of a sewage network and a second side, the barrier movable in the direction of the second side in response to fluid pressure on the first side. The blocked sewer alert unit includes a transducer separated by the barrier from the sewage network, the transducer configured to generate an electrical signal when the barrier moves into the dry section. The blocked sewer alert unit includes an alarm circuit configured to convert the electrical signal into a user alert.

10 Claims, 8 Drawing Sheets

(56) References Cited

U.S. PATENT DOCUMENTS

| | | |
|---|---|---|
| 7,907,059 B1 | 3/2011 | Guy |
| 8,059,004 B2 * | 11/2011 | James ............... E03C 1/242 |
| | | 340/607 |
| 8,066,029 B2 | 11/2011 | McDonald et al. |
| 8,418,550 B2 | 4/2013 | Hampton |
| 8,677,923 B2 | 3/2014 | Goff |
| 9,123,230 B2 | 9/2015 | Rogers |
| 9,127,445 B2 | 9/2015 | Dunn |
| 2007/0063856 A1 | 3/2007 | Gibson |
| 2013/0000416 A1 * | 1/2013 | Croft ............... G01F 1/002 |
| | | 73/861.18 |
| 2014/0230925 A1 * | 8/2014 | Halimi ............... G05D 16/20 |
| | | 137/487.5 |

* cited by examiner

METHODS, SYSTEMS, AND SOFTWARE FOR PROVIDING A BLOCKED SEWER ALERT

CROSS-REFERENCE TO RELATED APPLICATION

This application claims benefit of priority to U.S. provisional patent application no. 62/372,989, filed Aug. 10, 2016, the entirety of which is incorporated herein by reference. This application claims benefit of priority to U.S. provisional patent application no. 62/324,984, filed Apr. 20, 2016, the entirety of which is incorporated herein by reference.

FIELD OF THE INVENTION

The present invention generally relates to the field of plumbing. In particular, the present invention is directed to methods and systems for providing a blocked sewer alert.

BACKGROUND

Researchers, engineers, and tradesman are continually striving to improve plumbing systems for home and business owners. Part of this effort is directed toward protecting homeowners or business owners from costly plumbing related disasters. Throughout the years, new plumbing materials have been developed that drive down the cost of plumbing projects and help to prevent plumbing related incidents from occurring. However, these new plumbing materials have not solved all problems.

When a waste line backs up, a homeowner or business owner becomes aware of the problem when soiled water fills their shower pan, or spills from their toilet or sink, which creates an unsanitary condition in which they are exposed to potentially harmful bacteria and disease. At this point, a homeowner or business owner can no longer use the water. They must find a plumbing service; schedule an appointment and wait. When the service arrives they snake the waste line to remove the blockage (usually a tree root), which restores service, though the blockage usually reoccurs. The occupant is left to deal with a difficult clean up, and the knowledge that the backup and mess will happen again. Damage to property, such as floors, rugs, and furniture, can be extensive. This problem occurs approximately 10,000 times every week in the United States.

SUMMARY OF THE DISCLOSURE

In an embodiment, a blocked sewer alert unit is disclosed. Blocked sewer alert unit includes a substantially impermeable barrier having a first side exposed to the interior of a sewage network and a second side, the barrier movable in a direction of the second side in response to pressure on the first side. Blocked sewer alert includes a transducer separated by barrier from the sewage network, the transducer configured to generate an electrical signal when the barrier moves in the direction of second side. Blocked sewer alert unit includes an alarm circuit configured to convert the electrical signal into a user alert.

In another embodiment, disclosed is a blocked sewer alert unit installed. Blocked sewer alert unit installed includes a blocked sewer alert unit. Blocked sewer alert unit includes a cleanout port.

In another embodiment, a method for generating a blocked sewer alert is disclosed. Method includes detecting, by a blocked sewer alert unit, an increase in sewage level in a sewage network. Method includes generating, by blocked sewer alert unit, a user alert in response to the increase in sewage level.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Some aspects of the present invention are directed to a blocked sewer alert unit including a substantially impermeable barrier, such as a diaphragm, designed and configured to have a first side exposed to a possible sewer back up and a second side. In response to enough pressure on first side of barrier by sewage during a sewer backup, second side of the barrier moves toward a transducer that generates an electrical signal as a result of the motion. An alarm circuit generates a user alert. Following the alert, when a user prepares to snake a waste line they may then open a cleanout port in the blocked sewer alert unit, which would relieve pressure, and drain the backed-up sewage from the line. Cleanout port permits the user to control and direct the release of backed-up sewage. Without clean out port, backed-up sewage would be removed from the waste line when the user opened the clean out cap, and sewage would spray in all directions. This would expose the user, the basement ceiling, walls and floors, and any items in proximity to the sewage cleanout, to harmful bacteria-laden sewage. Barrier may be designed so that it moves to activate the alert when exposed to only a small amount of sewage backup. Indeed, with proper design and execution, blocked sewer alert units including a clean out port made in accordance with the present invention can readily save a homeowner or business owner from experiencing damages in their living space that may be caused by a sewer backup and greatly reduce, if not eliminate, any damages in their basement caused by a sewer back-up when the clogged waste line is opened and snaked. Thus, in some embodiments, blocked sewer alert unit eliminates the need to clean up after a blocked sewer in a living space; blocked sewer alert unit may also eliminate the need to clean up in a basement or other location where the sewage network is accessed to drain the backup or alleviate the blockage. These and other aspects of the present invention are described below in connection with several exemplary embodiments. Those skilled in the art will readily appreciate that the disclosed embodiments are merely exemplary and that many other embodiments can be derived and instantiated using the broad teachings of this disclosure.

Figure 1A:
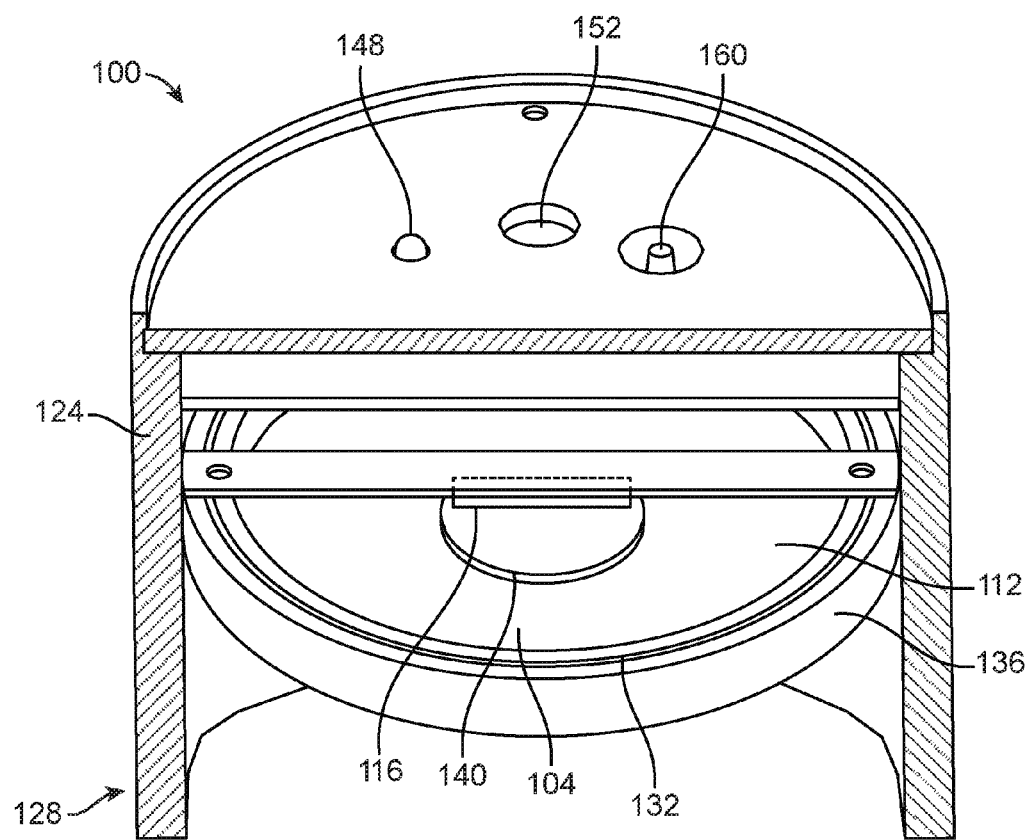
FIG. 1A is an illustration of an exemplary blocked sewer alert unit in a disengaged position, in accordance with aspects of an embodiment.
Figure 1B:
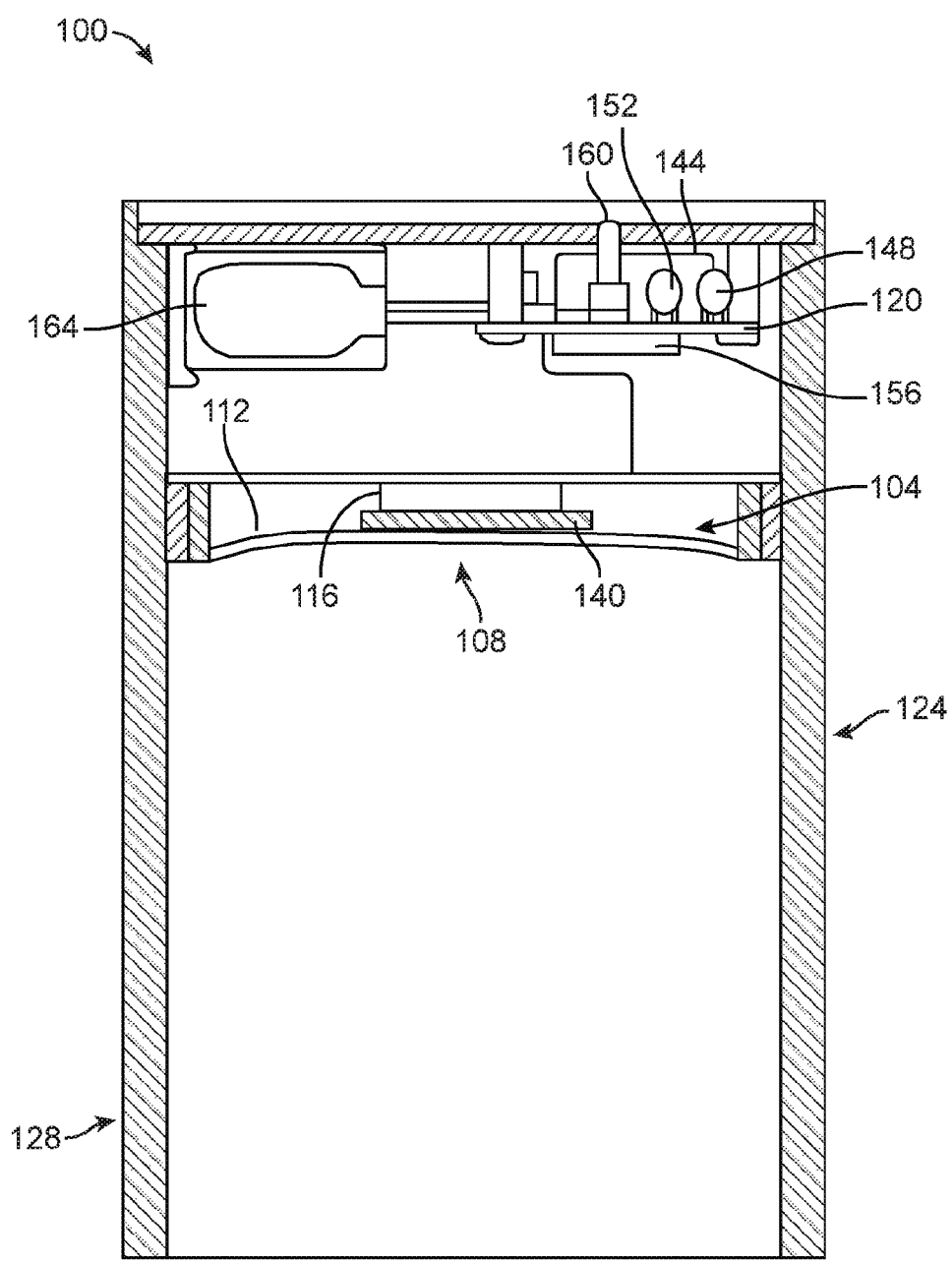
FIG. 1B is an illustration of an exemplary blocked sewer alert unit in an engaged position, in accordance with aspects of an embodiment.

Turning now to the drawings, FIGS. 1A and 1B illustrate some primary elements and an exemplary general configuration of a blocked sewer unit 100 made in accordance with the present invention. Blocked sewer alert unit 100 includes a substantially impermeable barrier 104 having a first side 108 and second side 112. First side 108 of barrier 104 is exposed to the interior of a sewage network, so that an increase in pressure in the sewage network adjacent to the barrier 104 occasions an increase in pressure on the first side 108. Barrier 104 is movable in the direction of second side 112 in response to pressure on first side 108, as shown for example in FIG. 1B. Blocked sewer alert unit 100 includes a transducer 116 separated by barrier 104 from the sewage network. Transducer 116 is configured to generate an electrical signal when barrier 104 moves toward the transducer 116 in response to pressure. Blocked sewer alert unit 100 includes an alarm circuit 120 configured to convert the electrical signal into a user alert.

Blocked sewer alert unit 100 is incorporated in a sewage network. As used herein, a sewage network is a network of pipes in a building that carries sewage from inputs, such as drains or toilets, to an output, such as a septic tank or public sewer. The drains may include, without limitation, floor drains, sink drains, bathtub drains, shower drains, and drains incorporated in fixtures such as washing machines and dishwashers. Sewage may include any water received in any drain or toilet, as well as anything introduced into the drain or toilet in addition to water, including without limitation human waste, detergents and other cleansing chemicals, toilet paper, and other sanitary products. A sewage network may include at least a building sewer. A sewage network may include at least a drain line; the drain line may run from a toilet, a sink, a washing machine, a dishwasher, a bathtub, or any other household appliance or fixture from which sewage is drained to the sewer. A sewage network may include a drainpipe. A sewage network may include a waste stack; a waste stack as used herein is a vertical pipe into which drainpipes and drain lines run, and which connects at its bottom to the building sewer. Blocked sewer alert unit 100 may be installed at any point in a sewage network. For instance, blocked sewer alert unit 100 may be installed at a point in sewage network below the lowest drain that empties into the sewage network, so that blocked sewer alert unit 100 alerts a user regarding a blocked sewer prior to sewage backing out of any drain; blocked sewer alert unit 100 may be installed at a point in sewage network below all drains in the sewage network except a basement floor drain. As a non-limiting example, blocked sewer alert unit 100 may be installed in a waste line cleanout or waste stack cleanout, as described in further detail below. An object that has an internal space, such as a pipe or other conduit, a chamber or tank, or a housing as described below is "connected" to the sewage network if the interior of the object is in communication with the interior of the sewage network, so that material passing through the sewage network may pass into the internal space of the connected object as well. For instance, a pipe or sewage cleanout connected to a sewage network has an interior that opens into the interior of the sewage network, so that, absent a barrier like substantially impermeable barrier 104, sewage may pass from the network and through the pipe or sewage cleanout.

The sewage network may include a sewage cleanout. As used herein, a sewage cleanout is a length of pipe attached to a sewage network to give access to the network. A sewage cleanout may be a relatively short length of pipe connected to a pipe in the sewage network, such as a waste stack or drain line, via a Y-junction or T-junction. The sewage cleanout may terminate with a cap, which may be attached via threading, clamping, or similar means. A sewage cleanout may be used to access a sewage network for the purposes of diagnosing and removing clogs and other backups. The sewage cleanout may be located inside of a building; for instance, the sewage cleanout may be located in the building's basement. A sewage cleanout may not contain sewage waste or other fluid when the sewage network is operating normally; for example, a sewage cleanout attached to a waste stack normally receives very little sewage waste, as the waste traveling through the waste stack falls rapidly to the building sewer, and then flows outward. More generally, a sewage cleanout in a backed-up sewage network may experience greater sustained pressure than a sewage cleanout in a normally functioning sewage network, as the backed up sewage waste in the former case creates a hydraulic head exerting additional pressure on the interior surface of the sewage cleanout.

Referring to FIGS. 1A and 1B in further detail, barrier 104 is substantially impermeable. In one embodiment, barrier 104 is substantially impermeable if no sewage or other fluids from the sewage network pass from one side of the barrier 104 to the other during a sewage backup event; barrier 104 may also be substantially impermeable to gas, such as sewage gases. In some embodiments, barrier 104 substantially impermeable to fluid or gas if barrier 104 is impermeable at pressures typically present during a sewage backup event; barrier 104 may be substantially impermeable if barrier 104 permits very little fluid or gas to pass barrier 104. Barrier 104 may be any barrier that is movable in response to pressure while remaining substantially impermeable. Pressure may include any pressure exerted on barrier 104 by sewage, sewage gases, or other liquid, gaseous, or solid materials, including an obstruction such as a tree root. Barrier 104 may be a substantially rigid object that occupies a space in which the barrier 104 is located within the sewage network sufficiently tightly to seal a joint between the barrier 104 and the walls of the sewage network against fluid incursion; for instance, barrier 104 may be a piston head, which may have an elastomeric skirt or sealing ring sealing the barrier 104 against the sides of a shaft containing the barrier 104. In other embodiments, for instance as shown in FIGS. 1A and 1B, barrier 104 includes a diaphragm. Diaphragm may be made of natural or artificial elastomeric materials, such as rubber or silicone. Diaphragm may include a nitrile membrane. Where the sewer back up may be especially acidic or basic creating harsh conditions, a person of ordinary skill in the art after reading this disclosure in its entirety will readily appreciate that an appropriate material may be selected based on the conditions present, such as a nitrile membrane.

Barrier 104 may move in the opposite direction when the sewage recedes; for instance, where barrier 104 is a diaphragm, the barrier 104 may generate an elastic recoil force when stretched by the sewage, and the recoil force may cause the barrier 104 to return to its former shape, moving in the direction of the first side 108. Similarly, where barrier 104 is a piston head or other rigid object that slides in response to the sewage incursion, the barrier 104 may be connected to a biasing means (not shown), such as a spring, that generates a recoil force when the barrier 104 is moved toward the first side 108, and urges the barrier 104 in the opposite direction when the sewage recedes.

In some embodiments, barrier 104 functions to transmit motion or pressure from backed up sewer to transducer 116 while simultaneously protecting the transducer 116, alarm circuit 120, and other components from potentially harsh fluids and gases from the sewer network. Sewage networks may contain harsh chemicals such as highly acidic or basic cleaning products, bacterial or digestive enzymes, and harmful microorganisms, all of which can augment the corrosive effects of water on circuitry. Furthermore, sewage may contain impurities that make it more conductive, increasing the risk of short-circuit. Barrier 104 may act to prevent all such gases and liquids from reaching the circuitry while still permitting sensitive detection of sewage level increases, as described in further detail below.

In some embodiments, blocked sewer alert unit 100 includes a housing 124 containing barrier 104 and electrical components. Housing 124 may be made of waterproof material. Housing 124 may be made of corrosion-resistant material. For example, housing 124 may be made of polyvinyl chloride (PVC). Housing 124 may be composed of other materials other than PVC as long the material chosen protects the internal parts from the harsh sewer back up environment and that the material chosen provides adequate structural integrity for the components of blocked sewer alert unit 100. Housing 124 may be shaped to connect to a portion of the sewage network; for instance, housing 124 may terminate beyond first side 108 of barrier 104 in a slip connection 128 for insertion over piping of a particular size. Slip connection 128 may be formed to connect to 3-inch plumbing or to 4-inch plumbing. Persons skilled in the art will be aware of many other alternatives available for connecting housing 124 to a pipe or other element of a sewage network, such as threaded connectors, hose clamps, and other connectors used to join plumbing together. Some embodiments of blocked sewer alert unit 100 include adaptors (not shown) for variously sized plumbing. In some embodiments, housing 124 is designed to connect to a sewage cleanout; for instance, housing 124 may replace a cleanout cap on a sewage cleanout. Housing 124 may be adapted to connect via plumbing connectors onto a "Y" in a basement waste line, for example. This may permit blocked sewer alert unit 100 of one size to work with various plumbing configurations. A person of ordinary skill in the art after reading this disclosure in its entirety will readily appreciate the variety of possibilities. This may also permit an installing user to add additional fittings, as necessary, to adjust for a poorly positioned waste stack clean out. Slip connection 128 may allow for blocked sewer alert unit 100 to be easily installed onto a variety of different pipes or other plumbing.

In some embodiments, barrier 104 is housed in housing 124. Barrier 104 may be held in position within housing 124 by any suitable means. As a non-limiting example, where barrier 104 is a diaphragm, blocked sewer alert unit 100 may include a diaphragm inner ring 132 and diaphragm outer ring 136; diaphragm may be held in place by being sandwiched between diaphragm inner ring 132 and diaphragm outer ring 136. Diaphragm may be secured in place by any suitable means. Diaphragm outer ring 136 may be attached to an inner surface of housing 124, in which diaphragm is installed. Diaphragm outer ring 136 may be formed together with housing 124; for instance, diaphragm outer ring 136 may be molded together with housing 124. Where barrier 104 is installed in housing 124, the barrier 104 may divide that chamber into a "wet" side exposed to a potential sewage backup and a "dry" side containing components that are not exposed to the sewage backup; the components on the "dry" side may include transducer 116, alarm circuit 120, power source 164, battery test circuitry, and any connection to external power sources.

Transducer 116 may be any device that converts the movement of barrier 104 into an electrical signal. In some embodiments, transducer 116 is a pressure sensor such as a load cell or piezoelectric sensor; transducer 116 may generate an electrical signal upon being contacted by barrier 104 when the barrier 104 is forced toward the transducer 116 by the pressure of a sewage backup. In some embodiments transducer 116 directly generates the electric signal; in other embodiments, one or more electrical properties of transducer 116 change upon the application of pressure. As a non-limiting example, the resistance or capacitance of transducer 116 may change in response to pressure, causing a change in voltage that may be detected by alarm circuit 120; transducer 116 may be connected to a power source, so that changes in the electrical properties of the transducer 116 cause measurable changes in voltage or current. As a further example, transducer 116 may be a component that modifies its resistance in response to the motion of barrier 104; transducer 116 may be a potentiometer, for instance, with a wiper physically coupled to barrier 104, so that motion of the barrier 104 changes the resistance of the potentiometer, which may change the voltage across the potentiometer. In other embodiments, transducer 116 is a switch that changes from a first state to a second state in response to the motion of barrier 104. In some embodiments, the switch is open and essentially not conducting in the first state, and closed in the second state; in other embodiments, the switch is closed in the first state and open in the second state. As an example, transducer 116 may be a physical switch that is closed by application of pressure by barrier 104. Transducer 116 may be a tilt switch that changes its angle when displaced by barrier 104, causing the tilt switch to close. Transducer 116 may include a reed switch. In some embodiments, a magnet 140 is attached to second side 112 of barrier 104, and the motion of the barrier 104 toward the reed switch causes the reed switch to close. Switch may be connected to a power source, so that when the switch closes a measureable change in current occurs in the switch.

Transducer 116 may also be able to detect when barrier 104 recedes in response to the sewage receding; in other words transducer 116 may send a different signal, or the absence of a signal, when barrier 104 recedes. For instance, where transducer 116 is a pressure sensor such as a load cell, the transducer 116 may sense a reduction in pressure as barrier 104 moves back toward first side 108. Likewise, electrical properties of transducer 116, such as resistance or capacitance, that changed in response to the motion of barrier 104 may change back again in response to the barrier 104 receding. In the example where transducer 116 is a potentiometer, for instance, the resistance may change back to or near to its initial value when barrier 104 recedes. Similarly, where transducer 116 is a switch that changes from a first state to a second state when barrier 104 moves toward the transducer 116, the switch may revert to the first state when the barrier 104 recedes.

Alarm circuit 120 converts the signal generated by transducer 116 into a user alert. As used herein, a user alert is a signal that indicates to a user that a blockage has occurred in the sewage network. In some embodiments, user alert may indicate that a blockage has occurred in the sewage network or in a main sewer that the sewage network feeds into; for instance, a blocked or broken main sewer may cause sewage backup that is apparently identical to sewage backup caused by a blockage in a sewage network. User alert may indicate that the sewage level in the sewage network has risen, as detected by any blocked sewer alert unit 100 as disclosed herein. User alert may be an audible alarm, a visible alert such as a flashing light, a message displayed on a display coupled to blocked sewer alert unit, or a message conveyed to or displayed on a user device as disclosed below in reference to FIG. 4.

Alarm circuit 120 may include a processor 144. Processor 144 may incorporated in a microcontroller; for instance, processor 144 may be included in a package with one or more memory registers, or one or more data input/output modules. Microcontroller may also include a long-term memory such as a flash memory. Microcontroller may be a low-power controller. Processor 144 may be incorporated in a system on a chip. Processor 144 may be incorporated in a computer. As a non-limiting example, all circuit board assembly functions may be controlled by an 8-bit, low-power microcontroller IC1 or other appropriate assembly. After reading this disclosure in its entirety a person of ordinary skill in the art will readily appreciate the plethora of different appropriate controllers that may be used in accordance with aspects of an embodiment of the present invention. Processor 144 may measure the output of transducer 116 using one or more analog inputs (not shown); for instance, processor 144 may use an analog-to-digital converter (not shown) to convert the signal from transducer 116 to a binary-encoded number representing the signal. The binary-encoded number may be compared to a threshold level as described in further detail below. In other embodiments, processor 144 inputs the signal from transducer 116 at a digital input (not shown). As an example, upon detecting the movement of barrier 104, transducer 116 may produce a voltage interpreted by processor 144 as logic 1 or "high" voltage, while when the transducer 116 produces a lower voltage interpreted by the processor 144 as logic 0 or "low" when the barrier 104 has not moved; the logic low voltage may be essentially zero volts, for instance if transducer 116 includes a switch that is opened. Persons of ordinary skill in the art will be aware that this may similarly be implemented with the significance of the voltage levels reversed in an "active low" protocol. More generally, processor 144 may interpret falling below a threshold amount, rather than rising above a threshold amount, as indicating a sewage backup.

Whether interpreted as an analog or digital signal, transducer 116 may directly produce a signal exceeding the threshold when barrier 104 moves toward the transducer 116. Alternatively, transducer 116 may connect to processor 144 by way of one or more circuit components that modify the signal from the transducer 116. For instance, alarm circuit 120 may include an amplifier (not shown) that boosts or reduces transducer 116 signal to match the threshold value. Alarm circuit 120 may include a comparator (not shown) that outputs a voltage exceeding the threshold when transducer 116 signal exceeds a reference voltage; for example, comparator may be set to output a logic 1 voltage when transducer 116 signal exceeds the reference voltage, or the comparator may be set to output a voltage level that an analog-to-digital converter will convert to a number exceeding the threshold. Similarly, comparator may output a negative or zero voltage signal when transducer 116 signal is below the reference voltage. Alarm circuit 120 may also be configured to interpret a modification of transducer 116 signal as indicating that the sewage has receded. For instance, the threshold indicating sewage backup may be a first threshold, and processor 144 may have a second threshold indicating that the sewage has receded.

Barrier 104, transducer 116, and/or alarm circuit 120 may be configured to detect rising sewer upon only a slight increase in pressure against the barrier 104; barrier 104 may activate transducer 116 upon an increase in pressure resulting from a sewage level in the sewage network reaching the barrier 104. Barrier may activate transducer 116 upon sewage level rising above barrier. As a non-limiting example, where barrier 104 is a diaphragm, the elastic resistance to movement of the diaphragm may be low enough that a very slight increase in pressure moves the diaphragm sufficiently to activate transducer 116. Similarly, transducer 116 may be sufficiently sensitive, or set sufficiently close to barrier 104, to produce a signal upon only a slight movement of barrier 104.

Alarm circuit 120 may include at least an audio output device 148 that generates an audible alarm when processor 144 detects that a sewage backup has occurred. Audio output device 148 may include a speaker. Audio output device 148 may be set to output an alarm at any decibel level; for instance, the decibel level may be 95 decibels. As a non-limiting example, an audible alarm driver may be comprised of resistors R1, R8, transistor Q1 and a piezo audible indicator audible alarm. Continuing the example, a tone may be generated by enabling a Numerically Controlled Oscillator (NCO) in a microcontroller; NCO may be programmed to generate a 4.2 kilohertz square wave, for example, which may be applied to a gate of Q1 through R1, switching audible alarm at its designed frequency. Further continuing the example, resistor R8 may prevent high voltage transients from a piezo crystal in audio output device 148 from damaging transistors or other transient-sensitive circuit components.

Alarm circuit 120 may include at least a light output device 152. Light output device 152 may include a light-emitting diode (LED) or similar solid-state light-emitting component. Alarm circuit 120 may cause light output device 152 to signal that blocked sewer alert unit 100 is operational; for instance, alarm circuit 120 may cause light output device 152 to "blink" on for a brief moment on a periodic basis. The light output device 152 may briefly emit light every 30 seconds to indicate that blocked sewer alert unit 100 is operational, for example. Light output device 152 may emit light briefly each time alarm circuit 120 checks the battery as described in further detail below. Alarm circuit 120 may include a data connection 156 to a remote device. Data connection 156 may include a wired connection such as an Ethernet connection. Data connection 156 may include a wireless connection. Wireless connection may be effected using a transceiver that sends and receives electromagnetic signals; for instance, the wireless connection may be performed using a transceiver implemented using the BLUETOOTH protocol promulgated by Bluetooth SIG, Inc. of Kirkland, Wash. Wireless connection may be performed using other protocols such as a "wi-fi" protocol. Alarm circuit 120 may include a display (not shown); the display may be any display as described below in reference to FIG. 7.

Alarm circuit 120 may have one or more components for user inputs. User inputs may include a reset button 160, which may cause alarm circuit 120 to switch to alarm acknowledge mode, as set forth in further detail below. Alarm circuit 120 may include any other input devices described below with reference to FIG. 7, including without limitation keyboards, keypads, touchpads, touchscreens, and additional buttons. Persons skilled in the art will be aware that a user may also enter user inputs using a remote device in communication with alarm circuit 120, such as a computer, smartphone, tablet, or other appliance capable of electronic communication with the alarm circuit 120.

Alarm circuit 120 and transducer 116 may be communicatively connected using any manner of wired or wireless data connections. In some embodiments, two or more elements of alarm circuit 120 or transducer 116 are combined on a circuit board, such as a printed circuit board; components may be attached to the circuit board by any suitable means, including without limitation, soldering, surface-mounting or through-hole mounting. Other connections may be implemented in the form of, for example, data buses, Internet connections, local network connections, and/or any other connections between electronic devices or portions of one or more devices.

With continued reference to FIGS. 1A-B, circuit elements of blocked sewer alert unit 100, including alarm circuit 120 and transducer 116, may be powered by an electric power source 164. Electric power source 164 may be an energy storage device such as a battery. As a non-limiting example, battery may be a 9-volt battery. It will be readily appreciated by a person of ordinary skill in the art after reading this disclosure in its entirety that other energy sources may be easily implemented in accordance with aspects of the instant invention. For example, blocked sewer alert unit may be hardwired to a home's electrical system, utilize solar energy, or include a battery charging unit that recharges batteries in blocked sewer alert unit 100 when batteries run low. Similarly, where blocked sewer alert unit 100 receives its power primarily from a source other than a battery, such as mains power, a battery may be included as a backup. Persons skilled in the art will be aware of various efficient battery backup circuits that may be deployed in a device of this nature. These varied energy sources are provided for example and are not intended to be limiting. Any appropriate electric power source 164 may be used. The battery may be held in place by battery clip and battery holder.

Electric power source 164 may include a power regulator (not shown). As a non-limiting example, a microcontroller may operate from a direct current (DC) voltage supply such as a 5 V supply, which may be extracted from a voltage regulator supplied by a battery. Capacitors C1, C2 may provide a required filtering for a voltage regulator. Persons skilled in the art will be aware that voltage sources with multiple output voltages may be used, and are available at various tolerances; multiple voltage sources may be used together in a single circuit as well. Persons skilled in the art will also be aware of regulators, such as voltage or current sources incorporating rectifiers, that may be used to regulate alternating current power, such as mains power, as well.

Alarm circuit 120 may be configured to have two or more modes for the purposes of saving power; for instance, alarm circuit 120 may have a sleep mode, a battery test mode, an alarm mode, and an alarm acknowledge mode. In the sleep mode, blocked sewer alert unit 100 may be kept in a state where all circuit functions are turned off, except for processor 144. In a sleep mode blocked sewer alert unit 100 may consume approximately 50 micro amps of current. A built-in Watch Dog Timer (not shown), for example, may wake processor 144 at a programmed interval of approximately 32 seconds or other appropriate interval. It is noted that the interval noted above is only provided for example and that it is not meant to be limiting in any way. Alarm circuit 120 may output a signal indicating its continued operation upon wakeup, for instance by producing an audio signal, flashing a light, or sending a message to a remote device. In some embodiments, where blocked sewer alert unit 100 uses a battery or other energy storage device as its primary power source 164, blocked sewer alert unit 100 may be designed to save power and make the energy storage device last for a defined period; for instance, where the battery is a 9-volt rectangular battery, blocked sewer alert unit 100 may be designed to operate for up to a period of one year. Blocked sewer alert unit 100 may operate primarily in sleep mode to conserve battery life.

In some embodiments, when alarm circuit 120 wakes up for its duty cycle during sleep mode, the alarm circuit 120 performs a battery check to determine whether the battery needs replacement. Alarm circuit 120 may enter battery test mode to check the battery on each "wakeup" in the duty cycle; alternatively, alarm circuit 120 may enter battery test mode less frequently, such as once an hour or once a day. As a non-limiting example, alarm circuit 120 may test battery using a battery test circuit (not shown) comprised of resistors R2, R3, R4 and transistor Q2. To test a battery processor 144 may turn on Q2 through R2. Resistors R3 and R4 may form a voltage divider in series with Q2; with Q2 in an ON state, current may flow from a battery's positive terminal to circuit ground. A voltage at a junction of R3, R4 may be ⅓ a battery voltage. This voltage may be applied to a comparator connected to alarm circuit 120, and may further be compared to an internal voltage reference. If a battery voltage drops below approximately 6.1 volts, for example, a low battery alarm may issue. The low battery alarm may include an audible alarm, a light signal, a message to a remote device, or any combination thereof. For instance, light output device 152 may be turned off and he audio output device 148 may be turned on for approximately 10 milliseconds, or any other appropriate amount of time, to alert a user that a battery should be replaced. The low battery alarm may repeat at a regular time interval, such as a 32 second interval, for example until a battery is replaced or the battery voltage drops below a usable level. Alarm circuit 120 may also cause light output device 152 to emit light briefly when alarm circuit 120 wakes up for its duty cycle; light output device 152 may thus blink at regular intervals to indicate to a user that blocked sewer alert unit 100 is operational.

Alarm mode may be triggered by the detection of the electric signal from transducer 116 by alarm circuit 120; for instance, where transducer 116 includes a reed switch and magnet 140 combination as noted above, an alarm condition may occur when reed switch is actuated by magnet 140 on barrier 104. This may cause alarm circuit 120 to immediately exit a sleep mode, and enter alarm mode. Alarm circuit 120 may run on a higher duty cycle when in alarm mode; in some embodiments, alarm circuit 120 remains on continuously when in alarm mode. One or more of output elements may output periodically or continuously while alarm circuit 120 is in alarm mode; for instance, audible alarm may be activated and remain on until an alarm condition is acknowledged. In embodiments where transducer 116 can detect a recession of sewage, alarm circuit 120 may receive the signal from the transducer 116 indicating that sewage has receded, and blocked sewer alert unit 100 may return to sleep mode.

With regard to the electronic components of FIGS. 1A and 1B and described above, it is noted that special coatings may be provided for on the outer surface of these electronics. The harsh environments that may exist in a basement where blocked sewer alert unit 100 may be installed have the potential to cause possibly cause electrical elements to corrode or wear prematurely and ultimately fail. Barrier 104 may insulate electronics from hostile gases and fluids from the sewer network. A coating may further protect electrical elements from corrosive gases and fluids. The coating may also operate to protect electronics from moisture and humidity often found in basements, which may be very detrimental to electronics. Many different anti-corrosive and anti-wear coatings are known and may be selected and applied to the electronic components depending on the user environment or may be provided for without consideration of an environment where blocked sewer alert unit 100 may exist. After reading this disclosure in its entirety a person of ordinary skill in the art will readily appreciate the different coatings that may be applied to prevent early wear and tear on the electronic components.

Although blocked sewer alert unit 100 has been described above for exemplary purposes as including a substantially impermeable barrier 104 and transducer 116, blocked sewer alert unit 100 may use any suitable device to detect a rising sewage level. For instance, blocked sewer alert unit 100 may include a pressure sensor, such as a load cell, a piezoelectric sensor, or a bladder switch. Blocked sewer alert unit 100 may include a device that detects rising sewage levels using other means; persons skilled in the art will be aware of many devices that may be used to detect the level of a column of fluid or fluid and solid matter mixed together, the distance from a surface, or other factors that may be used to determine the sewage level and to determine that the sewage level is rising. Persons skilled in the art will be aware that alarm circuit 120 may communicate with any such device similarly to transducer 116, and generate a user alert as a result.

Figure 2:
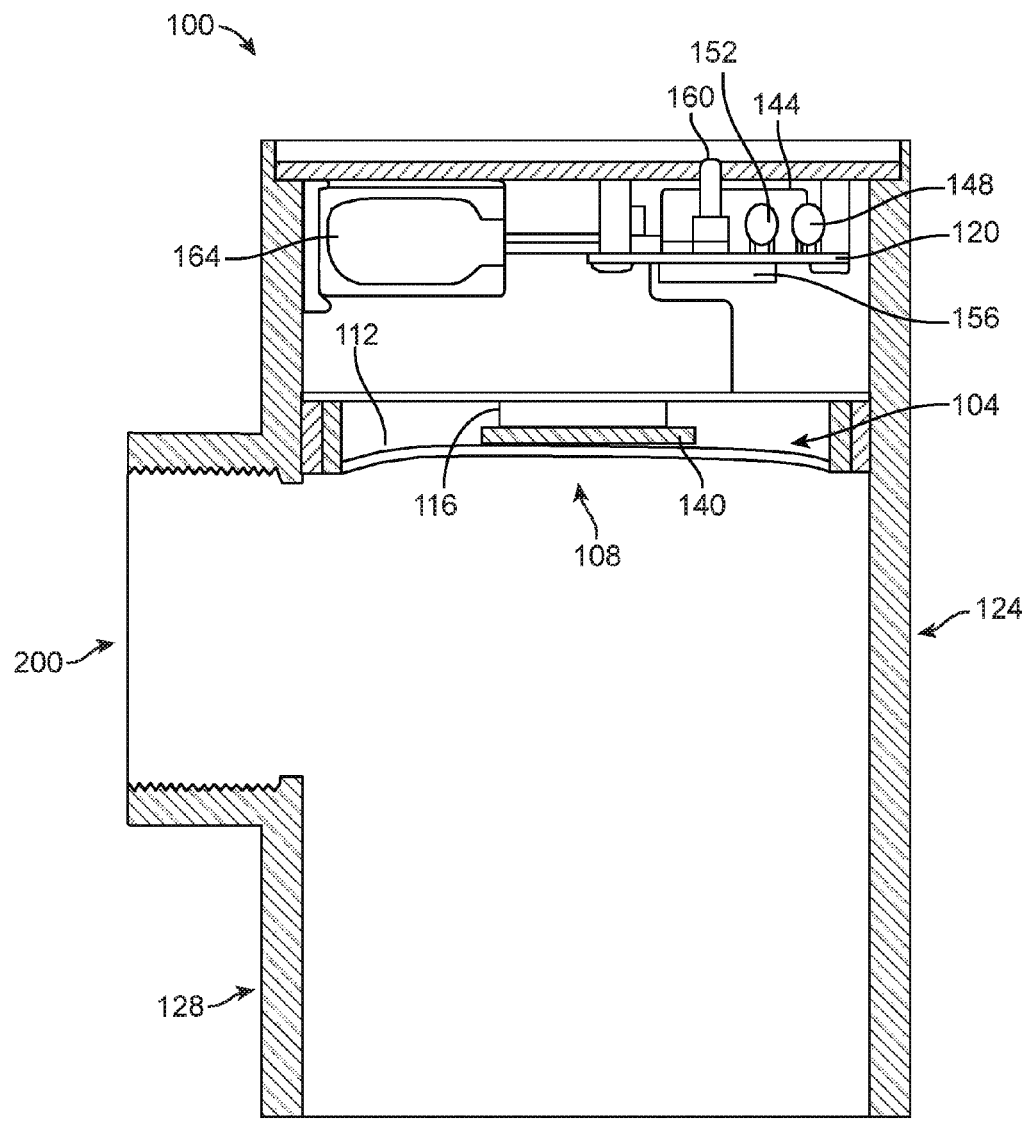
FIG. 2 is an illustration of an exemplary blocked sewer alert unit including a clean out port in accordance with aspects of an embodiment.

In some embodiments, as illustrated for example in FIG. 2, blocked sewer alert unit 100 includes a cleanout port 200. Cleanout port 200 may be an opening that gives a user access to sewage network; in some embodiments, cleanout port 200 is near to barrier 104. For instance, cleanout port 200 may be located adjacent to first side 108 of barrier 104. Where blocked sewer alert unit 100 includes a housing 124, cleanout port 200 may include an opening in the housing 124; for instance, cleanout port 200 may include an opening in housing 124 adjacent to first side 108 of barrier 104. Cleanout port 200 may include a length of pipe. The length of pipe may be made using any pipe suitable for use in plumbing, including PVC pipe; the length of pipe may have any suitable length or diameter. As a non-limiting example, cleanout port 200 may include a length of 1½ inch piping. In some embodiments, cleanout port 200 includes a plumbing connector that allows the cleanout port 200 to be connected to additional plumbing or other components. For example, cleanout port 200 may be threaded. Cleanout port 200 may include a national pipe thread (NPT) connector, which may have internal or external threading. Additional pipe, valves or valve housings, or other elements may be attached to cleanout port 200 by any suitable means, including connecting to plumbing connector; in some embodiments cleanout port 200 includes an additional element, such as a valve, if the additional element is attached to cleanout port 200 using a plumbing connector or other means. In some embodiments, a cleanout port 200 close to barrier 104 may enable a user to drain or pump out backed up sewage as soon as it reaches blocked sewer alert unit 100, triggering the alarm; a user may be able to access cleanout port 200 before significant pressure has built up, extracting backed up sewer without risking spraying or other spillage resulting from higher pressures often encountered when a cleanout cap is removed. Alternatively, after the sewage level has mounted above blocked sewer alert unit 100, a user may open a valve (see FIG. 3) or otherwise unstop cleanout port 200 to drain sewage from sewage network in a controlled fashion. Cleanout port 200 may open downward, permitting the easy installation of a bucket or tank beneath cleanout port 200 to catch sewage exiting cleanout port 200; where cleanout port 200 includes a threaded plumbing connector, a user may attach a hose, pipe, or other tube to cleanout port to facilitate draining cleanout port 200. In some embodiments, cleanout port 200 allows a user, such as a plumber, to insert devices to clear obstructions. In other embodiments, for instance where blocked sewer alert unit 100 is installed on or in a sewage cleanout, a user may remove the blocked sewer alert unit 100 from the sewage cleanout to snake or otherwise clear obstructions; any sewage pressure may first be drained off using cleanout port 200. Cleanout port 200 may be stopped so that sewage and sewage gases are unable to leak out of the cleanout while stopped; for instance, cleanout port 200 may include a valve as shown for example in FIG. 3. Upon reading the entirety of the disclosure, a person of ordinary skill in the art will be aware of many options that may be used to stop cleanout port 200, such as, without limitation, a valve, a threaded cap, a soldered cap, or a clamped cap. In some embodiments, cleanout port is angled downward, so that for instance a user may be able to set a bucket under the cleanout port prior to unstopping the cleanout port.

Figure 3:
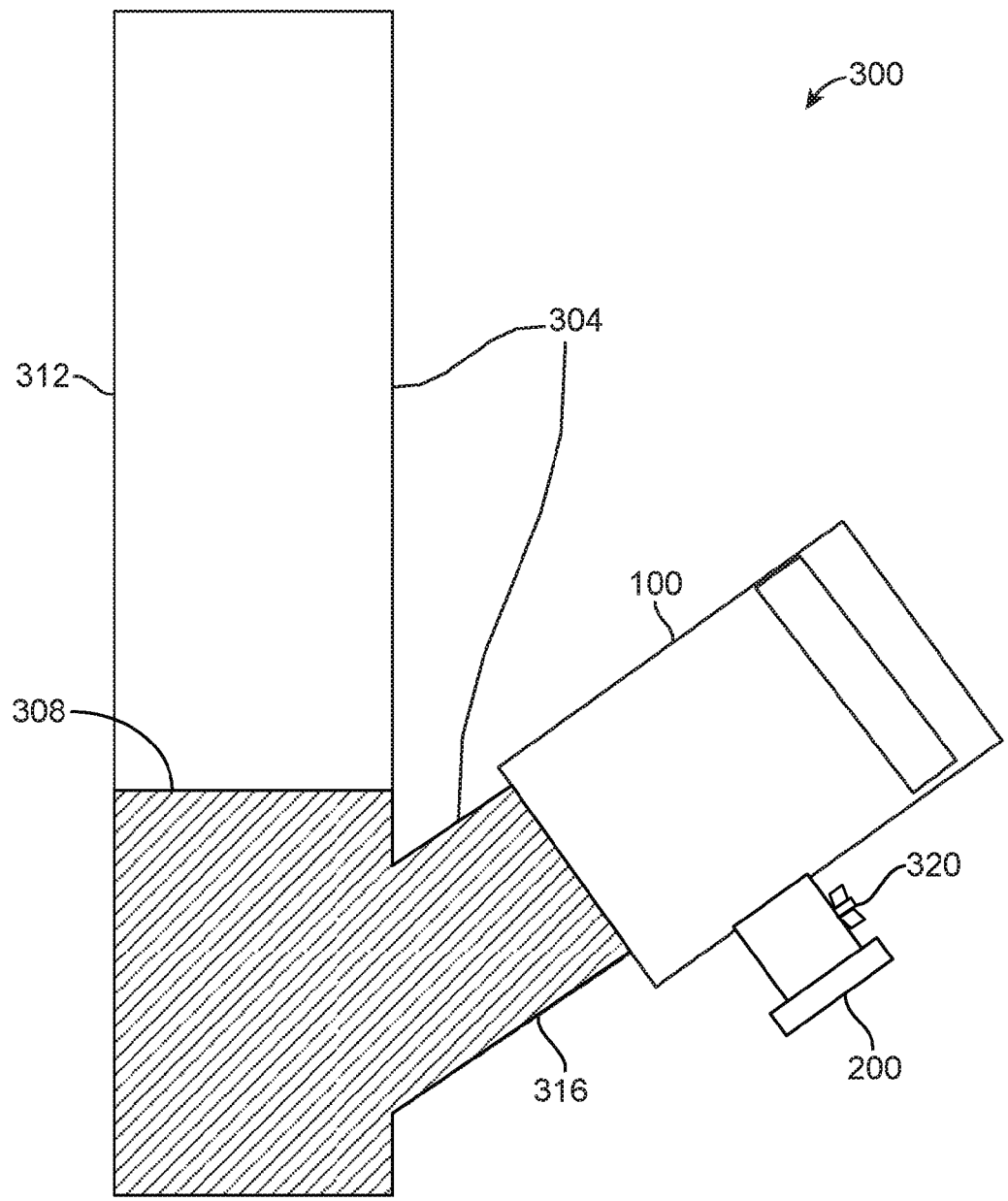
FIG. 3 is an illustration of an exemplary blocked sewer alert unit installed, in accordance with aspects of an embodiment.

Turning now to FIG. 3, an exemplary embodiment of a blocked sewer alert unit installed 300 is illustrated. As an overview, blocked sewer unit installed 300 includes blocked sewer alert unit 100 operatively engaged to a sewage network 304. Blocked sewer alert unit 100 includes a cleanout port 200.

Viewing FIG. 3 in further detail, blocked sewer alert unit 100 may be any electronic device that can sense a rising sewage level 308 in a sewage network and generate a user alert, including without limitation any blocked sewer alert unit 100 as described above in reference to FIGS. 1A-2. In other embodiments, blocked sewer alert unit 100 is not necessarily as described in reference to FIGS. 1A-2; for instance, blocked sewer alert unit 100 may have no substantially fluid proof barrier 104. Blocked sewer alert unit 100 may detect the rising sewage level using a pressure sensor, such as a load cell, a piezoelectric sensor, a diaphragm switch, or a bladder switch, directly exposed to the sewage network, so that an increase in pressure within the sewage network causes the blocked sewer alert unit 100 to generate the user alert. Blocked sewer alert unit 100 may detect the rising sewage level by any suitable means; persons skilled in the art will be aware of many different methods for determining the level of fluid mixtures such as sewage in a pipe or network of pipes such as a sewage network.

Blocked sewer alert unit 100 is operatively engaged to a sewage network 304; as used herein, blocked sewer alert unit 100 is operatively engaged to a sewage network 304 if the blocked sewer alert unit 100 is engaged to the sewage network 304 in a manner that enables the blocked sewer alert unit 100 to operate as designed to detect a rising sewage level within the sewage network 304 and generate a user alert in response. As a non-limiting example for the purposes of illustration only, where blocked sewer alert unit 100 is a blocked sewer alert unit 100 incorporating a substantially impermeable barrier 104 as described above in reference to FIGS. 1A-2, the blocked sewer alert unit 100 may be operatively engaged to sewage network 304 where first side 108 of substantially fluid proof barrier 104 is exposed to increases in pressure due to a rising level of sewage in sewage network 304. Similarly, and as a further example, where blocked sewer alert unit 100 is a pressure sensor in communication with an alarm circuit, the blocked sewer alert unit 100 may be operatively engaged to sewage network 304 if the pressure sensor is placed where the pressure sensor is able to detect increases in pressure within the sewage network 304. Persons skilled in the art will be aware of the various forms operative engagement may take for different forms of blocked sewer alert units.

Sewage network 304 may be any sewage network as described above in reference to FIGS. 1A-2. Sewage network 304 may include a waste stack 312 as defined above in reference to FIGS. 1A-2. Sewage network 304 may include a sewage cleanout 316. Sewage cleanout 316 may be a sewage cleanout as described above in reference to FIGS. 1A-2. Sewage cleanout 316 may be connected to any pipe in sewage network. For exemplary purposes only, sewage cleanout 316 is shown here as a 'Y' coming off a waste stack 312. Although illustrated as a 'Y' junction, sewage cleanout 316 may not be installed with a 'Y' junction at all. For example, plumbing systems vary greatly and blocked sewer alert unit 100 may be used on a variety of different types of plumbing fittings, such as a T fitting with the bottom closed off and alarm circuit 120 mounted to the top. After reading this disclosure in its entirety a person of ordinary skill in the art will readily appreciate the vast number of different plumbing configurations that may come off of a waste stack and allow for blocked sewer alert unit 100 to be installed. Sewage cleanout 316 may alternatively be connected to a waste line or building sewer. As long as the plumbing configuration to be used in conjunction with blocked sewer alert unit 100 allows for sewage 308 to back up when there is an issue sufficiently to be detected by the blocked sewage alert unit 100, that plumbing configuration may be included in sewage cleanout 316.

Blocked sewer alert unit 100 includes cleanout port 200. Cleanout port 200 may be any cleanout port 200 as described above in connection with FIG. 2. Cleanout port 200 may include a valve 320; valve 320 may be any valve suitable for use in stopping an opening in, or connected to, a sewage network. Valve 320 may include a manual actuator such as a key or handle that a user can turn to open valve 320 and drain cleanout port 200 or close valve 320 and stop cleanout port 200. In some embodiments, where blocked sewer alert unit 100 includes a housing, cleanout port 200 includes an opening in the housing.

Figure 4:
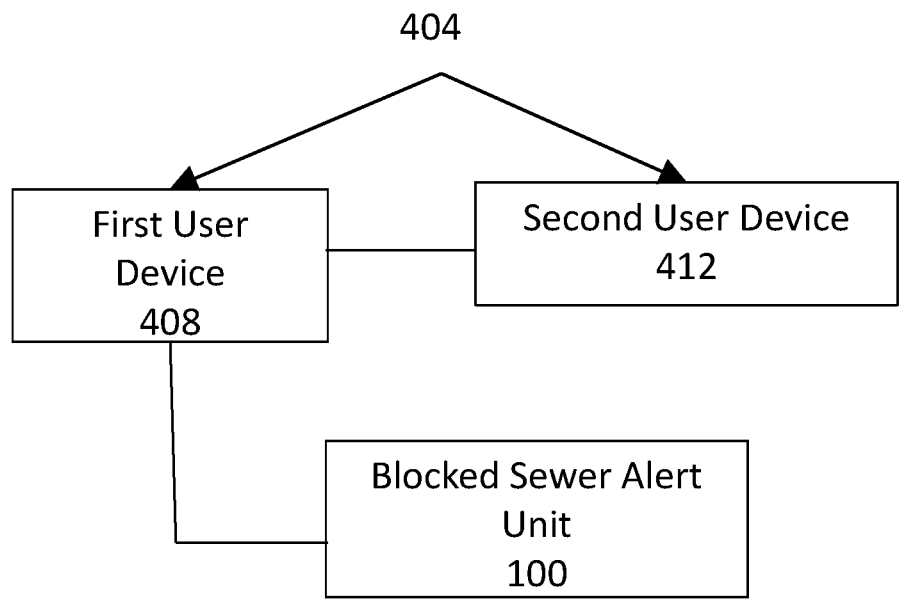
FIG. 4 is a block diagram representing a home network incorporating a blocked sewer alert unit, in accordance with aspects of an embodiment.

Turning now to FIG. 4, an exemplary embodiment of a home network with a blocked sewer alert 400 is illustrated. Home network 400 includes a blocked sewer alert unit 100 operatively engaged to a sewage network. Home network 400 includes at least a user device 404 configured to communicate with blocked sewer alert unit 100.

Viewing FIG. 4 in further detail, home network 400 includes a blocked sewer alert unit 100. Blocked sewer alert unit 100 may be any electronic device that can sense a rising sewage level in a sewage network and convey a message to a user device, including without limitation any blocked sewer alert unit 100 as described above in reference to FIGS. 1A-3. Blocked sewer alert unit 100 is operatively engaged to a sewage network; as used herein, blocked sewer alert unit 100 is operatively engaged to a sewage network if the blocked sewer alert unit 100 is engaged to the sewage network in a manner that enables the blocked sewer alert unit 100 to operate as designed to detect a rising sewage level within the sewage network and generate a user alert in response. As a non-limiting example for the purposes of illustration only, where blocked sewer alert unit 100 is a blocked sewer alert unit 100 incorporating a substantially impermeable barrier 104 as described above in reference to FIGS. 1A-2, the blocked sewer alert unit 100 may be operatively engaged to the sewage network where first side 108 of the substantially fluid proof barrier 104 is exposed to increases in pressure due to a rising level of sewage in the sewage network. Similarly, and as a further example, where blocked sewer alert unit 100 is a pressure sensor in communication with an alarm circuit, the blocked sewer alert unit 100 may be operatively engaged to the sewage network if the pressure sensor is placed where the pressure sensor is able to detect increases in pressure within the sewage network. Persons skilled in the art will be aware of the various forms operative engagement may take for different forms of blocked sewer alert units.

User device 404 may include any device capable of receiving data from blocked sewer alert unit 100 and communicating that data to a user. User device 404 may include any computing device as described below in reference to FIG. 7. User device 404 may include a desktop computer. User device 404 may include a laptop computer. User device may include a mobile device smartphone, tablet, or PDA. User device 404 may include a data-enabled household appliance; for instance, user device 404 may include a "smart" thermostat equipped to communicate wirelessly with other computing devices. In some embodiments, user device 404 includes more than one device. As a non-limiting example, user device 404 may include a desktop computer and a smartphone. Similarly, user device 404 may include a mobile device and a data-enabled appliance. In some embodiments user device 404 includes a first device 408 that communicates with blocked sewer alert unit 100 locally and communicates with a second device 412 via a more extensive network such as the Internet or a cellular phone network; first device 408 may relay information from blocked sewer alert unit 100 to second device 412, and may relay user instructions from the second device 412 to the blocked sewer alert unit 100.

In other embodiments, at least a user device 404 is configured to communicate with blocked sewer alert unit 100 by detecting that blocked sewer alert unit 100 is emitting an alarm. For instance, at least a user device 404 may include an audio input device (not shown) such as a microphone. Persons skilled in the art will be aware that user devices such as smartphones or "smart" household devices may include audio input devices; examples include the ECHO DOT and other ALEXA-enabled devices produced by Amazon Technologies, Inc. of Seattle, Wash., and GOOGLE HOME devices produced by Google, Inc. of Mountain View, Calif. In some embodiments, blocked sewer alert unit 100 emits an audible alarm using audio output device 148, and at least a user device 404 detects the audible alarm using audio input device. In some embodiments, blocked sewer alert unit 100 does not communicate with at least a user device 404 via a data connection 156; blocked sewer alert unit 100 may not include a data connection 156, or data connection 156 may not be connected to, paired with, or compatible with at least a user device 404. At least a user device 404 may nonetheless be able to detect audible alarm and generate a user alert as described below in reference to FIGS. 5 and 6.

In some embodiments, home network 400 is configured to detect an increase in a sewage level in a sewage network, produce a user-detectable alert, based on the detected increase, and to calculate an estimated volume of remaining capacity in the sewage network, as described in further detail below in reference to FIG. 6. Persons skilled in the art will readily appreciate that home network 400 may perform other methods within the scope of this disclosure, including without limitation the detection of an increase in sewage level in a waste stack, or the detection of sewage level in a sewage cleanout, and the resultant generation of a user alert. In some embodiments, home network 400 provides users with a convenient and mobile way to monitor the state of a sewage network in a building, whether the users are within the building or elsewhere.

Figure 5:
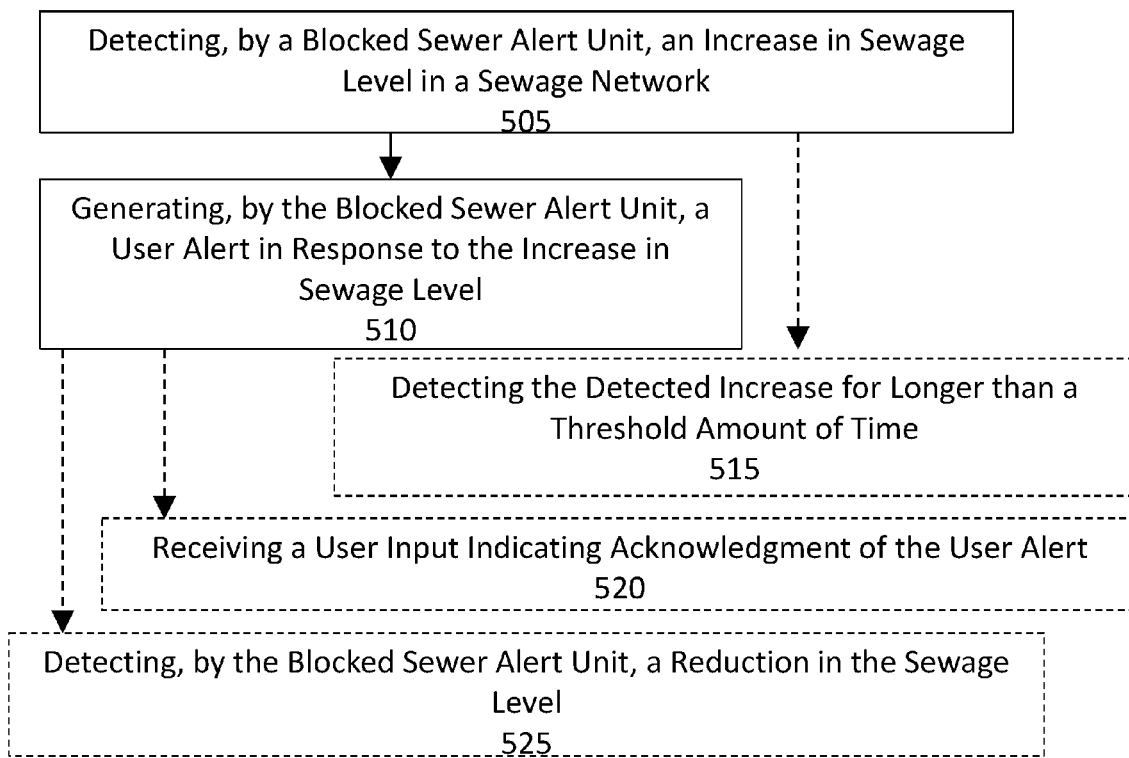
FIG. 5 is a flow diagram illustrating an exemplary method for generating a blocked sewer alert, in accordance with aspects of an embodiment.

FIG. 5 illustrates an exemplary embodiment of a method 500 for generating a blocked sewer alert. Method 500 includes detecting, by a blocked sewer alert unit, an increase in sewage level in a sewage network (505). Method includes generating, by blocked sewer alert unit, a user alert in response to the increase in sewage level (510).

Viewing FIG. 5 in further detail, and with reference to FIGS. 1A-4, blocked sewer alert unit 100 may include any blocked sewer alert unit 100 as described above in reference to FIGS. 1A-3, as a non-limiting example. Blocked sewer alert unit 100 may detect an increase in sewage level by any means described above in reference to FIGS. 1A-4. In some embodiments, blocked sewer alert unit 400 detects the rising sewage level by detecting an increase in pressure within the sewage cleanout using any pressure sensor described above in reference to FIG. 3. Blocked sewer alert unit 100 may compare pressure sensed with a pressure sensor to a threshold value; for instance blocked sewer alert unit 100 may compare a voltage signal from a pressure sensor to a reference voltage using a comparator. Blocked sewer alert unit 100 may convert the voltage signal to a digital number compare the digital number to a threshold number stored in memory of blocked sewer alert unit 100; as noted above, the voltage signal may be received directly from a pressure sensor or may be amplified, fed to a comparator, or otherwise adjusted or transformed by circuitry in blocked sewer alert unit 100. Alternatively, where a switch, such as a reed switch, is actuated by the pressure as described above, detecting the increase in pressure may involve detecting the voltage or current generated by, through, or across the switch.

In some embodiments, detecting the increase in pressure also includes detecting the rise in sewage level for longer than a threshold amount of time (515); the threshold may be a number of seconds or clock cycles stored in memory of blocked sewer alert unit 100. In some embodiments, a timer is set to count down clock cycles or seconds from the threshold number. If the threshold amount of time passes with the detected sewage level remaining at or above the initially detected level, blocked sewer alert unit 100 may generate the user alert. For instance, where blocked sewer alert unit 100 detects the increase in sewage level by detecting an increase in pressure in excess of a particular threshold amount, the blocked sewer alert unit 100 may generate the user alert only if the detected increase in pressure remains in excess of the threshold during the entire threshold period; similarly, where an increase in pressure has actuated a switch, blocked sewer alert unit 100 may generate the user alert only if the switch remains actuated during the entire threshold time. Blocked sewer alert unit 100 may periodically poll sensor or transducer 116 input to processor 144 and compare the value detected upon each polling to the threshold or verify that the switch remains actuated; alternatively, an event handler such as an interrupt may be enabled by the detection of a signal in excess of the threshold or the actuation of a switch, and triggered by the falling of the signal below the threshold or the return of the switch to its initial state. As a non-limiting example, where the time threshold is 3 seconds, a timer may start upon detection of the pressure increase and count down clock cycles equal to 3 seconds unless the interrupt is detected; if the interrupt is detected after 2 seconds, the timer may stop and be reset, to start again upon the detection of a second pressure increase sufficient to exceed the threshold or actuate the switch. Continuing the example, if the interrupt is not detected prior to the countdown of three seconds reaching zero, blocked sewer alert unit 100 may generate a user alert. Persons skilled in the art will be aware that many alternative processes may be used in place of a timer and interrupt to ensure that the sewage level remains above the detectable level for the full threshold period of time.

Blocked sewer alert unit 100 may generate the user alert by generating an audible alarm. Audible alarm may be produced using any audio output device 148 described above in reference to FIGS. 1A-2. As a non-limiting example, audible alarm may be a constant tone that is output continuously unless interrupted by further process steps as described below. Audible alarm may be a 95 decibel alarm. In some embodiments, a user device such as at least a user device 404 described above in reference to FIG. 4 detects the audible alarm using an audio input device; user device may then generate a user alert in response as set forth in further detail below in connection with FIG. 6. Blocked sewer alert unit 100 may generate the user alert by generating a visible signal. Visible signal may be generated using any light output device 152 described above in reference to FIGS. 1A-2. In some embodiments, visible signal is a constant light output or a flashing light. Blocked sewer alert unit 100 may generate the user alert by transmitting a message to at least a remote device; remote device may be a user device 404 as described above in reference to FIG. 4. Message to remote device may be in the form of a text message such as a simple message service (SMS) message. The message to remote device may be in the form of a network packet or a series of network packets. In some embodiments, blocked sewer alert unit 100 sends a message upon each change of status; for instance, blocked sewer alert unit 100 may send a first message on detecting the increase in sewage level and a second message if the blocked sewer alert unit 100 detects that the sewage level has fallen again as described in further detail below. In other embodiments, blocked sewer alert unit 100 sends periodic updates, such as an update per second; for instance, blocked sewer alert unit 100 may send no data when there is no detected increase in sewage level, an initial alert upon an initial detection of sewage level, and periodic updates indicating the current status until the sewage level recedes. Alert, whether received by a user audibly or via personal computing device may prompt a user to stop using his or her plumbing or to use it sparingly until a sewer back up problem can be resolved.

Some embodiments of method 500 also include calculating, by blocked sewer alert unit 100, an estimated volume of remaining capacity in the sewage network. The remaining capacity in a sewage network, as used herein, is the amount of sewage that may be put into the network, after the detected blockage, before the sewage begins to emerge from the lowest drain in the sewage network and above blocked sewer alert unit 100. Depending on the plumbing configuration within an individual home, specifically the length of waste line between blocked sewer alert unit 100, or other sensor, and the lowest drain in the house, a homeowner or business owner may continue to use their water sparingly, after the blocked sewer alert unit 100 has issued the alert, while waiting for their plumbing service to arrive or before addressing the matter themselves. A user, such as a plumber or a homeowner or business owner with sufficient plumbing knowledge, may enter one or more instructions to blocked sewer alert unit 100 indicating one or more measurements of the sewage network above the sewage cleanout. The one or more measurements may include a length of pipe from the sewage cleanout to one or more drains in the sewage network; for instance the one or more measurements may include a length of pipe from the sewage cleanout to the lowest drain in the network. The measurements may include the length of pipe from blocked sewer alert unit 100 to each drain in the network. The measurements may include the width of pipe in at least a section of the sewage network. Blocked sewer alert unit 100 may store a numerical value indicating the volume of sewage the system may accept before the lowest drain begins backing up, assuming the sewage level has already reached blocked sewer alert unit 100. Blocked sewer alert unit 100 may calculate this number, or may receive it from a remote device that calculates the number, for instance, if the blocked sewer alert unit 100 has limited program memory.

In some embodiments, the available volume remaining in the sewage network before overflow is calculated by determining the volume of all pipes in the sewage network that are below the lowest drain and above blocked sewer alert unit 100; this volume may be calculated by multiplying the length of each total amount of pipe at a given width by the cross-sectional area of the pipe lumen. Thus, for instance, a 4-inch pipe may have an internal cross-sectional area of 12.56 square inches; if the total length of all branches of 4-inch piping found between the level of blocked sewer alert unit 100 and the level of the lowest drain is 100 inches, the volume of sewage that may be contained in all of that 4-inch pipe may be 1,256 cubic inches, or about 5.44 gallons. A similar calculation may be performed with the total length of pipe having other internal diameters, such as 3-inch waste line. For instance, a standard 3-inch waste line may hold 1.14 gallons of sewage for approximately every 3 feet of length. When blocked sewer alert unit 100 sends the user alert to a remote device, the user alert may include the total volume of sewage the user may safely put into the sewage network before it overflows; this number may be a number less than calculated total volume, for instance to allow an uncertainty buffer, and ensure that the user stops using the water well before it begins backing out of the lowest drain. A user with sufficient plumbing knowledge such as a plumber or knowledgeable homeowner or business owner may ascertain the lengths and internal cross-sectional areas of the pipes in the sewage network that are below the lowest drain and blocked sewer alert unit 100.

A user such as a plumber or knowledgeable homeowner or business owner may similarly enter information indicating the usage patterns of one or more appliances. For instance, the user may determine the volume of water used by a washing machine or dishwasher in a given cycle, for example by looking at a user's manual or at ratings associated with the washing machine or dishwasher. The user may similarly ascertain the amount of sewage that is added to the sewage network each time a particular toilet is flushed. Blocked sewer alert unit 100 may use this information to estimate the number of uses of each such appliance that would fill the remaining capacity; that information may be conveyed to the user in the form of a user alert. In some embodiments, the user enters the rate of drainage of sewage during use of an appliance; for instance, a shower may send a certain number of gallons per second down the drain when in ordinary use. Blocked sewer alert unit 100 may use that rate information to estimate the amount of time of use of that appliance that would fill the remaining sewage network capacity; that information may be conveyed to the user in the user alert. In some embodiments, blocked sewer alert unit 100 performs these calculations. Alternatively, a remote device may perform the calculations and convey them to blocked sewer alert unit 100, which may store them locally, either after the detection of the rising sewage level or at an earlier time.

It is noted that the calculation of remaining capacity in the sewage network, as well as the number of uses of at least a fixture, or time of usage of at least a fixture, that may be performed prior to a drain backing up, may be performed by any sensor coupled to an alarm circuit 120 as described above, and is not limited to performance by a blocked sewer alert unit 100 installed in a sewage cleanout. Further, it is noted that the calculations may be performed and displayed entirely using alarm circuit 120, and displayed using a display coupled to that circuit, without the need to communicate with any additional device. Thus, in some embodiments, a self-contained unit including a sewage level sensor and an alarm circuit 120 not only warns of a problem before a major cleanup is required, but also affords a homeowner or business owner limited use of their water while they wait for a plumbing service to arrive. There is no battery-operated product like this on the market today.

Some embodiments, of method 500 further include receiving, by blocked sewer alert unit 100, a user input indicating acknowledgment of the user alert (520). In some embodiments, the user enters the input using a manual input device incorporated in blocked sewer alert unit 100, such as a keypad, touchscreen, or reset button 160. The user may press reset button 160, for instance, which blocked sewer alert unit 100 may interpret as indicating user acknowledgement of the alarm. Blocked sewer alert unit 100 may receive the user input via a data connection to a remote device; for instance, the user may enter a user instruction on a user device as described above in reference to FIG. 4. The user instruction may be in the form of a text message, such as an SMS message, or one or more network packets. As a non-limiting example, blocked sewer alert unit 100 may transmit a message indicating that the user should text a particular character or string to acknowledge the alarm; the message may provide the user with a selectable image on the display of the user device, such as button or link.

Blocked sewer alert unit 100 may modify the user alert in response to the user input. In some embodiments, blocked sewer alert unit 100 enters alarm acknowledge mode, as described above in reference to FIGS. 1A-2. Blocked sewer alert unit 100 may stop outputting all or part of the user alert; for instance, if the user alert includes an audible alarm, the audible alarm may switch off. Likewise, where the user alert includes a visible alarm, the visible alarm may switch off. Blocked sewer alert unit 100 may continue to output some part of a user alert; for instance, audio output device 148 may periodically "chirp" or otherwise indicate audibly that an alert condition persists. Similarly, a light-output device may periodically flash to indicate the persistence of the alarm condition. Alerts may continue to be sent via the data connection; however, the alerts may be sent less frequently, or limited to changes in status. As a non-limiting example, a user may depress a reset button 160, causing the blocked sewer alert unit 100 to switch off an audible alarm from a continuous state, while as long as blocked sewer alert unit 100 continues to detect the sewage level increase, an LED may flash at rate of once every 2 seconds, for example, and approximately every 30 seconds, for example, audible alarm 148, may give two short "beeps", indicating an alarm condition may still be present.

Method 500 may include detecting, by blocked sewer alert unit 100, a reduction in the sewage level (525). In some embodiments, blocked sewer alert unit 100 detects the sewage level using a sensor or transducer 116 that also modifies its signal in response to a decrease in sewage level; for instance, blocked sewer alert unit 100 may be able to detect a decrease in pressure within sewage network 304, as described above in reference to FIGS. 1A-3. Where blocked sewer alert unit 100 uses at least a sensor that detects sewage level, the sensor may be able to detect a reduction in sewage level by the same means used to detect an increase in sewage level; for instance, a pressure sensor able to detect an increase in pressure may be able to detect a decrease in pressure. In some embodiments detecting a reduction in the sewage level includes detecting that the sewage level has decreased below a threshold level; the comparison to the threshold may be performed according to any process described above. The threshold may be the same as the threshold to which the sewage level is compared in step 505; alternatively, the threshold may differ, for instance by being lower than the first threshold. This use of hysteresis may help to ensure that blocked sewer alert unit does not interpret a small fluctuation as a genuine reduction in sewage level. Detecting the reduction in the sewage level may also include detecting that the reduction persists for more than a threshold amount of time; the threshold amount of time may be the same as the threshold amount of time described above for detecting an increase in sewage level, or may be a different amount of time. Blocked sewer alert unit 100 may detect that the reduction persists for more than the threshold amount of time using any process described above for detecting the increase in sewage level for longer than a threshold amount of time.

In some embodiments, upon detecting the decrease in sewage level, blocked sewer alert unit 100 cancels the user alert. Canceling the user alert may include switching off an audible alarm. Cancelling the user alert may include switching off a visible alarm. Canceling the user alert may include transmitting a message to a remote device, such as a user device 410 described above in reference to FIG. 4, indicating that the sewage level has receded. In some embodiments, blocked sewer alert unit 100 enters sleep mode as described above in reference to FIGS. 1A-2 upon detecting the sewage level decrease. Blocked sewer alert unit 100 may have additional programming to account for the possibility that the user has partially or fully emptied the sewage network through the sewage cleanout without necessarily resolving the blockage itself. For example, when blocked sewer alert unit 100 detects the reduction in sewage level, the blocked sewer alert unit 100 may send a message to a user indicating the detected decrease in sewage level, and asking the user whether the decrease is because the user has used cleanout port 200 to alleviate pressure, or because the blockage has cleared; in the former case, blocked sewer alert unit 100 may remain in alarm mode or alarm acknowledge mode. Blocked sewer alert unit 100 may, for instance, revise a calculation of the amount of water the user can utilize before the sewage begins to back up out of a drain, and continue to send updates to the remote device indicating the amount of water the user can expect to be able to use.

Figure 6:
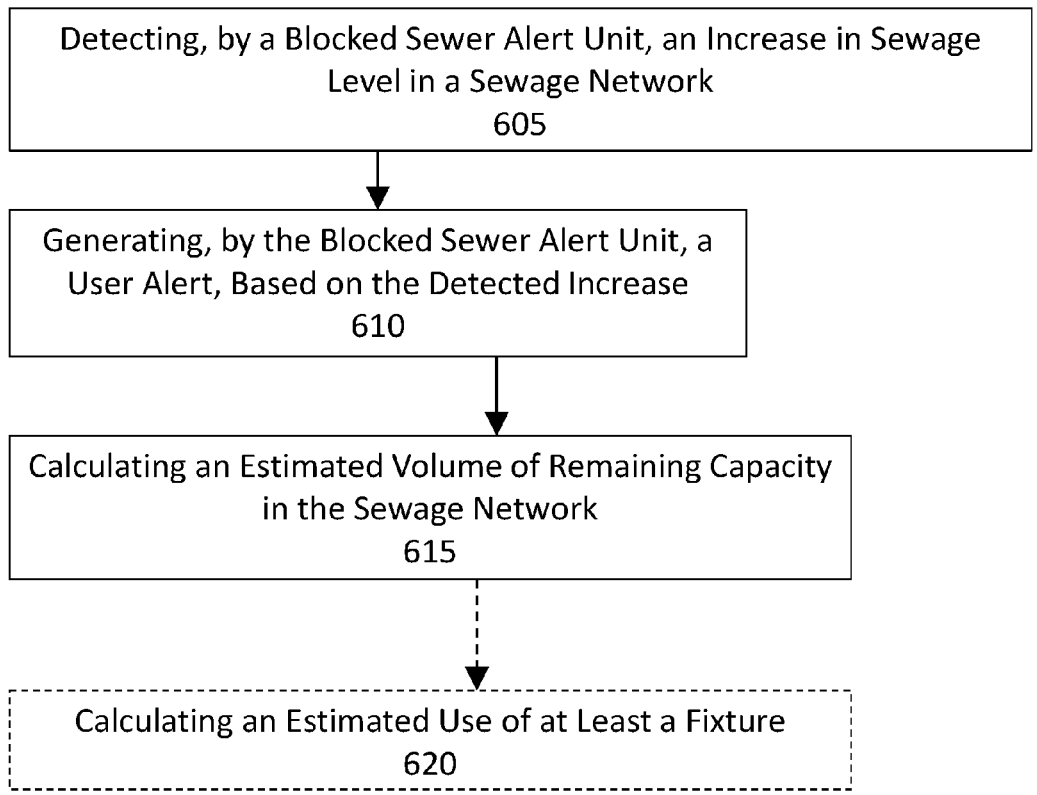
FIG. 6 is a flow diagram illustrating an exemplary method for generating a blocked sewer alert, in accordance with aspects of an embodiment.

FIG. 6 illustrates one embodiment of a method 600 for generating a blocked sewer alert. Method 600 includes detecting, by a home network comprising a blocked sewer alert unit and at least a user device, an increase in a sewage level in a sewage network (605). Method includes producing, by home network, a user alert, based on the detected increase (610). The method 600 includes calculating an estimated volume of remaining capacity in the sewage network (615).

Viewing FIG. 6 in further detail, and by reference to FIGS. 1A-4, home network detects an increase in sewage level in a sewage network (605). Home network 400 may perform this detection using any process described above in reference to FIG. 5. In some embodiments, blocked sewer alert unit 100 detects the increase in sewage level; blocked sewer alert unit 100 may be any blocked sewer alert unit 100 as described above in connection with FIGS. 1A-3. Home network 400 may detect the increase in sewage level by detecting the increase in sewage level in a waste stack incorporated in the sewage network. Home network 400 may detect the increase in sewage level in the sewage network by detecting an increase in sewage level in a sewage cleanout; In some embodiments, Home network 400 detects an increase in sewage level in the sewage network by detecting an increase in pressure in the sewage network; for instance, blocked sewer alert unit 100 may detect an increase in pressure within a sewage cleanout. Detecting the increase in sewage level may include detecting the sewage level increase for longer than a threshold amount of time; this may be implemented for instance as described above in reference to FIG. 5.

Home network may produce the user-detectable alert (610) using any process described above for producing a user alert in connection with FIG. 5. For example, producing the alert may include producing an audible signal. Producing the alert may include producing a visible signal. Producing the alert may include displaying a message on a display coupled to home network 400, such as a display of user device 404 or the display of blocked sewer alert unit 100 as described above in reference to FIGS. 1A-2. In some embodiments, the message is conveyed to a user device from blocked sewer alert unit 100. The message may also be conveyed from one user device to another user device; for instance, a device in the home of the user, such as a personal computer or Internet-enabled appliance or fixture, may receive the message from blocked sewer alert unit 100 and convey the message to a mobile user device such as a smartphone. The message may be generated by blocked sewer alert unit 100, for instance, where the blocked sewer alert unit 100 includes a processor 144 as described above for exemplary systems in reference to FIGS. 1A-3. In other embodiments, blocked sewer alert unit 100 sends a simpler signal to user device 404; the simpler signal may be a binary-encoded signal, such as a one or two-bit signal indicating alarm states corresponding to the sensed increase in sewage level. User device 404 may convert the simple signal to a message, for instance by using the signal as a key to look up a message stored in a data structure. In other embodiments, blocked sewer alert unit 100 emits an audible alarm using audio output device 148, and at least a user device 404 detects the audible alarm using audio input device. At least a user device 404 may then generate any user alert as described above, including text messages, messages displayed on screens, additional audio alerts, or additional visual alerts; at least a user device 404 may relay a message to another device such as another user device, via a data connection to the other device, a local network, or the Internet. Persons skilled in the art will be aware of many ways in which one datum may be used as a key to retrieve other data. The user alert may incorporate estimated volume of remaining capacity in the sewage network calculated as described below; the calculated information may alternatively be included in an additional user alert.

Home network calculates an estimated volume of remaining capacity in the sewage network (615). In some embodiments, this calculation is performed according to processes described above in reference to FIG. 5. User device 404 may perform the calculation. A processor 144 incorporated in or connected to blocked sewer alert unit 100 may perform the calculation. Any other device incorporated in home network 400 may perform the calculation. The calculation may be distributed between any combination of devices in home network 400; for instance, blocked sewer alert unit 100 may have a stored number representing the volume of capacity in the sewage network between the sensor location and the lowest drain in the sewage network, which may be calculated by blocked sewer alert unit 100 or user device 404. Alternatively, user device 404 may store the number representing the volume of capacity in the memory of the user device 404. The number representing the volume of capacity may be calculated when the user alert is generated. The number may be calculated prior to the generation of the user alert; for instance, the number may be calculated when information describing the sewage network is entered in the home network as described above in reference to FIG. 5.

Home network 400 may also include calculating estimated use of at least a fixture (620). This may involve calculating an estimated number of uses of fixture that may be performed without exceeding the estimated volume. This calculation may be performed as described above in reference to FIG. 5. The calculation may be performed by user device 404, blocked sewer alert unit 100, or any other element of home network 400, singly or in combination. The calculation may be performed at the time of the alert, or prior to the alert; for instance, the calculation may be performed when information concerning the fixture is entered in the home network, as described above in reference to FIG. 5. Home network 400 may calculate estimated use of at least a fixture by calculating an estimated amount of time fixture can be in use without exceeding the estimated volume. This calculation may be performed as described above in reference to FIG. 5. The calculation may be performed by user device 404, blocked sewer alert unit 100, or any other element of home network 400, singly or in combination. The calculation may be performed at the time of the alert, or prior to the alert; for instance, the calculation may be performed when information concerning fixture is entered in home network 400, as described above in reference to FIG. 5.

In some embodiments, home network 400 is thus able not only to warn the user of a blocked sewage network before a problematic buildup occurs, but to allow the user to continue to use the sewage network while waiting to resolve the blockage; the user may be able to track use of fixtures using the above-described calculations, and thus to ensure that no backup or spill results from the continued usage.

Home network 400 may receive a user input acknowledging the alert. The user input may be entered according to any process described above in reference to FIG. 5; for instance, the user alert may be entered on user device 404 or using a reset button 160 or other manual data entry device connected to blocked sewer alert unit 100. Where the alert is an audible alert, home network 400 may silence the audible alert. Home network 400 may produce at least a follow-up alert; this may be implemented as described above in reference to FIG. 5.

In some embodiments, home network 400 detects a decrease in sewage level and cancels the user alert. This may be performed as described above in reference to FIG. 5. In some embodiments, home network 400 produces a user alert indicating the lowering sewage level to the user. The user alert may be displayed on any display incorporated in home network 400, including the display of user device 404.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
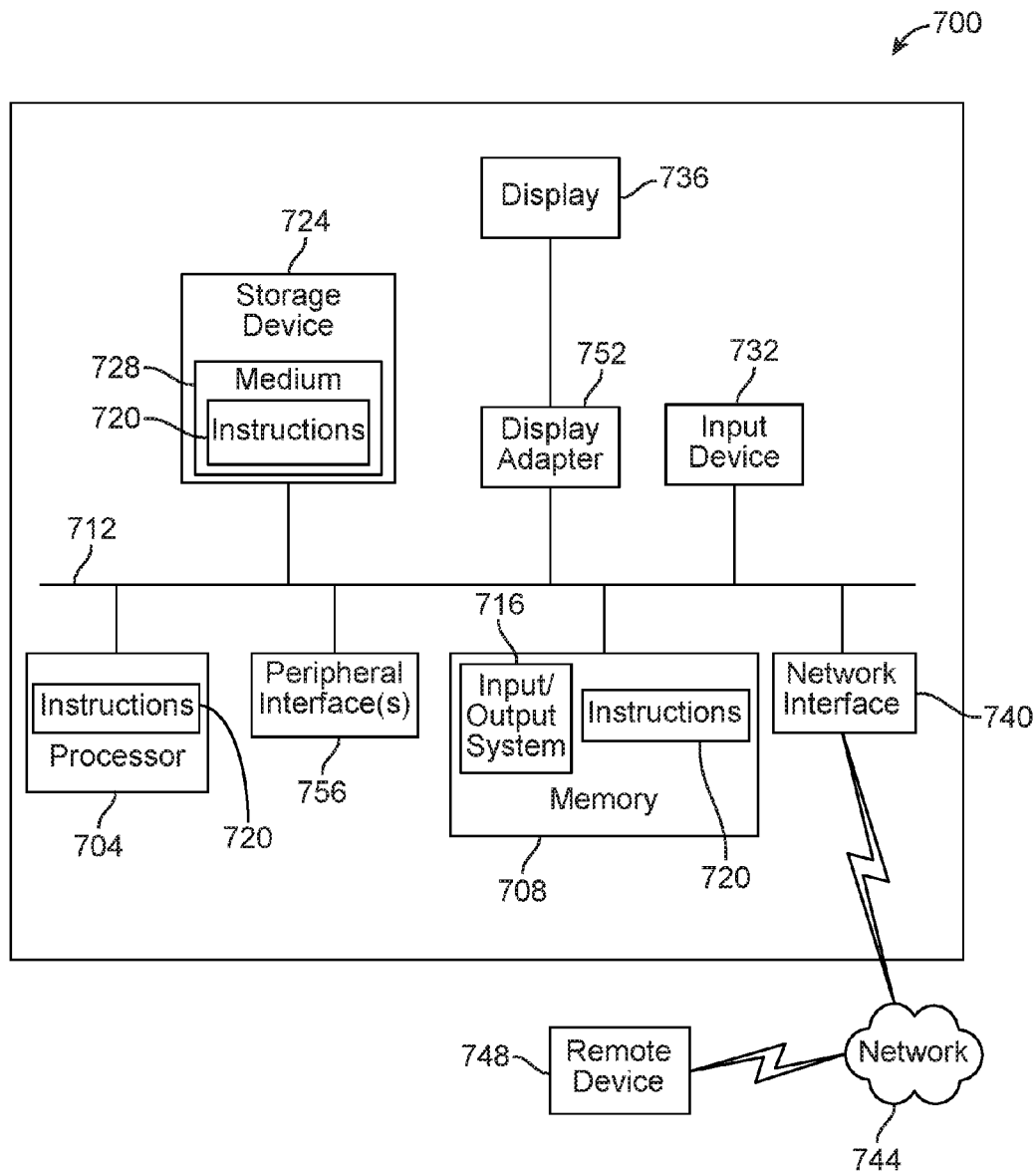
FIG. 7 is an exemplary diagrammatic representation of one embodiment of a computing device in accordance with an embodiment.

FIG. 7 shows a diagrammatic representation of one embodiment of a computing device in the exemplary form of a computer system 700 within which a set of instructions for causing a control system, such as blocked sewer alert unit 100 of FIGS. 1A-3, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve blocked sewer alert unit 100 and methods for its use according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blocked sewer alert unit, the blocked sewer alert unit comprising:
    a substantially impermeable barrier, the barrier having a first side exposed to the interior of a sewage network and a second side, the barrier movable in a direction of the second side in response to pressure on the first side;
    a transducer separated by the barrier from the sewage network, the transducer configured to generate an electrical signal when the barrier moves in the direction of the second side;
    an alarm circuit configured to convert the electrical signal into a user alert;
    a housing, the housing further comprising:
        a terminal section containing the substantially impermeable barrier, the transducer, and the alarm circuit;
        a connector operatively connecting the blocked sewer alert to the sewage network; and
        a section of pipe disposed between the terminal section and the connector, the section of pipe including a first opening connected to the terminal section and a second opening connected to the connector, wherein the section of pipe further comprises a cleanout port adjacent to the first side of the barrier and disposed between the first opening and the second opening;
    a length of pipe operatively connected to the cleanout port, the length of pipe terminating in an exterior opening;
    a valve in the length of pipe, the valve having a first state in which the valve prevents flow from the cleanout port to the exterior opening and a second state in which the valve permits flow from the cleanout port to the exterior opening.

2. The blocked sewer alert unit of claim 1, wherein the transducer further comprises a switch that generates an electrical signal when the barrier moves in the direction of the second side.

3. The blocked sewer alert unit of claim 2, wherein the switch is a reed switch, and further comprising a magnet attached to the second side of the substantially impermeable barrier.

4. The blocked sewer alert unit of claim 1, wherein the transducer further comprises a pressure sensor.

5. The blocked sewer alert unit of claim 1, wherein the transducer generates the electrical signal upon an increase in pressure resulting from a sewage level in the sewage network reaching the barrier.

6. The blocked sewer alert unit of claim 1, wherein the alarm circuit further comprises a data connection to a remote device.

7. The blocked sewer alert unit of claim 1, wherein the exterior opening further comprises a plumbing connector.

8. The blocked sewer alert unit of claim 1, wherein the connector is operatively engaged to a pipe in the sewage network.

9. The blocked sewer alert unit of claim 1, wherein the connector is operatively engaged to a sewage cleanout.

10. The blocked sewer alert unit of claim 1, wherein the transducer further comprises at least a pressure sensor.

* * * * *